Patented May 4, 1948

2,440,678

UNITED STATES PATENT OFFICE 2,440,678

PRODUCTION OF ALKYL-SUBSTITUTED ETHANES

Thomas Aven Ford and Henning Waldemar Jacobson, Wilmington, Del., assignors to E. I. du Pont de Nemours & Company, Wilmington, Del., a corporation of Delaware No Drawing. Application February 23, 1946, Serial No. 649,756

5 Claims. (Cl. 260—683.6)

This invention relates to the preparation of selected alkyl substituted ethanes, and to novel and improved methods for preparing hydrocarbons of the general formula

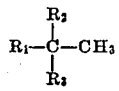

wherein $R_1$, $R_2$, $R_3$ are alkyl groups.

More specifically, the invention relates to a novel catalytic method for preparing hydrocarbons of the general formula

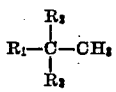

wherein $R_1$, $R_2$, and $R_3$ are lower alkyl radicals containing from 1 to 6 carbon atoms, such as methyl, ethyl, propyl, butyl, pentyl and the like. Still more specifically, the invention contemplates preparation, through a novel catalytic method, of 1,1,1-trialkylethanes, and especially trimethylbutane, highly useful as a fuel and fuel additive for internal combustion engines.

In accordance with this invention, a tertiary alkyl carbinol of the general formula

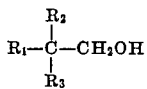

wherein $R_1$, $R_2$ and $R_3$ have the hereinbefore-defined meaning, is contacted with hydrogen in the presence of a base metal, especially cobalt, hydrogenation catalyst at an elevated temperature and pressure until hydrogenolysis is complete, separating the resulting products from the catalyst, and then isolating the desired hydrocarbon of the general formula

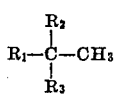

from the reaction mixture by conventional means.

In applying the invention in accordance with one preferred method, a trialkylacetic acid alkyl ester is heated to a temperature in excess of 100° C. under a hydrogen pressure in excess of 100 lbs. per square inch in the presence of a mild acting alcohol-forming hydrogenation catalyst, the alcohol obtained is separated from the catalyst and then heated with a metallic cobalt hydrogenation catalyst to a temperature in excess of 100° C. under a hydrogen pressure in excess of 100 lbs./sq. in. to bring about hydrogenolysis. The hydrocarbon thus obtained is separated from the cobalt catalyst and purified by subjecting it to distillation, fractionation, etc.

In another preferred method, a monoolefin of the general formula

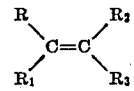

wherein $R$ and $R_1$ are alkyl groups and $R_2$ and $R_3$ are of the class of hydrogen and alkyl groups, is charged with water and an acid catalyst, such as boron trifluoride or sulfuric acid, into a high-pressure reactor constructed of or lined with an acid-resisting material and pressured with carbon monoxide. The charged reactor is closed and placed on an agitating machine and agitation is started. The reactor is heated to the desired reaction temperature and maintained at that temperature until no further reaction occurs, as evidenced by cessation of pressure drop within the reactor. This usually requires from 2 to 6 hours. Throughout the reaction period the pressure within the reactor is maintained by periodically repressuring with carbon monoxide. After reaction is complete, the reactor is cooled, the pressure is released, and the product discharged. The trialkylacetic acid thus obtained is isolated by conventional means from the reaction mixture and then esterified with a lower saturated aliphatic primary monohydric alcohol. The ester thus obtained is transferred to a pressure reactor and subjected to hydrogenation in the presence of a mild-acting alcohol-forming hydrogenation catalyst at a temperature in excess of 100° C. and a pressure in excess of 100 lbs./sq. in. The alcohol obtained is separated from the catalyst and charged into a pressure reactor with a metallic cobalt hydrogenation catalyst. The reactor is pressured with hydrogen and heated to a temperature in excess of 100° C. at a pressure in excess of 100 lbs./sq. in., and maintained under these conditions until there is no further hydrogenolysis. This generally occurs within the period of 2 to 10 hours. The hydrocarbon obtained is separated from the unconverted alcohol and catalyst and purified by conventional means.

In a variation of the process last described above, starting with a monoolefin of the type defined and to obtain exceptionally high yields of the desired trialkylacetic acid, a high pressure reactor constructed of or lined with a corrosion-resistant metal, usually silver, is charged with water and sufficient acid catalyst, e. g., boron trifluoride or sulfuric acid to yield an ultimate composition ranging from the half hydrate to the decahydrate, preferably the dihydrate to the tetrahydrate. The charged reactor is placed on an agitating rack and pressured with carbon monoxide to between 100 and 1000 atms. and heated to between 25 and 150° C., usually between 75 and 125° C. Into the heated reactor the monoolefin is injected at a rate of from 10 cc. to about 100 cc. per hour, preferably from about 40 cc. to about 60 cc. per hour, in amount sufficient to provide for about 0.25 to about one mol of the olefin per mol of catalyst. Following completion of the injection of the olefin, the reactor is maintained for an additional 1 to 10 hours at reaction temperature. Thereafter the reactor is allowed to cool, opened, and the contents discharged. The trialkylacetic acid thus obtained is esterified, usually with a lower saturated aliphatic primary monohydric alcohol, the ester hydrogenated over a mild-acting alcohol-forming hydrogenation catalyst, and the resulting alcohol subjected to hydrogenolysis over a metallic cobalt hydrogenation catalyst. The hydrocarbon thus obtained is isolated and purified by conventional means.

The process of this invention may be practiced either as a batch, semi-continuous or as a continuous operation and in the vapor or liquid phase. In the following illustrative examples, wherein the parts mentioned are by weight, there are indicated specifically certain conditions of temperature, pressure, weight of catalyst, and the like. It is to be understood that pressure and temperature are interdependent variables and variation in one of these variables necessitates adjustments in the other conditions.

EXAMPLE I

A stainless steel, pressure-resistant vessel is charged with 100 parts of 2,2,3-trimethyl-1-butanol and 20 parts of a cobalt-on-alumina catalyst. After closing and evacuating the vessel is placed in a shaker machine and pressured to 225 atms. with hydrogen. The vessel is then heated to 298° C. and the pressure is increased to 965 atms. The temperature is maintained at 298–308° C. for 18.25 hours. At the end of this time the tube is cooled, bled of excess hydrogen, opened and discharged. The product thus obtained is filtered to remove catalyst, dried over anhydrous magnesium sulfate, and fractionally distilled. The following fractions are obtained:

| Fraction | B. P. | Vol. | Weight | Composition |
|---|---|---|---|---|
|  | °C. | Cc. | Parts |  |
| I | 67–81 | 8 | 5.6 |  |
| II | 81–82 | 39 | 27 | Triptane. |
| III | 82–91 | 2 | 1.5 |  |
| IV | 91–157 | 9 | 6.5 |  |
| V | 157–157.5 | 35 | 28 | 2, 2, 3-trimethyl-1-butanol. |
| Hold-up |  | 5 | 4 |  |

EXAMPLE II

(A) Step 1.—Carboxylation of tetramethylethylene

A silver-lined, high-pressure reaction vessel is charged with 121.8 parts of boron fluoride trihydrate (1 mol.). After closing, the vessel is pressured to 400 atms. with carbon monoxide and weighed. The vessel is then placed in a shaker machine and heating and agitation are begun. When the temperature reaches 75° C. (at which temperature a pressure of 600 atms. develops) continuous injection of tetramethylethylene at a rate of about 45 cc./hour is started and continued until a total of 115 parts of the olefin has been added. This is conveniently approximated by noting the distance traveled by the piston which effects the injection. The temperature is maintained at 75–76° C. for 7 hours after the olefin has been added. Before the tube is bled of carbon monoxide it is weighed and it is found from the gain in weight over the first weighing that 73 parts of tetramethylethylene (0.87 mol) has been injected. The tube is bled of carbon monoxide and the solid product floating on top of the aqueous boron fluoride is discharged. The tube is rinsed with benzene to prevent loss. After shaking with water to decompose the boron fluoride/fatty acid complexes, the benzene layer is separated, washed twice with water, and the benzene and water are removed by distillation. The pressure is then reduced to 11 mm. and 113 parts of 2,2,3-trimethylbutanoic acid distills over at 100–101° C. This is the theoretical yield based on the weight of tetramethylethylene injected.

(In a variation of Step 1, just described, the 2,2,3-trimethylbutanoic acid can be prepared by charging a silver-lined, pressure-resistant vessel with 152 parts of sulfuric acid trihydrate (1 mol) and, after closing, pressuring to 400 atms. with carbon monoxide. The tube is then placed in a shaker machine and heated to 100° C., at which temperature a pressure of 550 atms. develops. Tetramethylethylene is then injected continuously as described in Example I until a total of about 115 parts has been added. Heating is continued for 6.5 hours after this and the vessel is then cooled, bled of excess carbon monoxide, opened, discharged, and rinsed with benzene. The product thus obtained is distilled with steam, the steam distillate is extracted with benzene, and the organic layer is distilled. There is obtained 97 parts of 2,2,3-trimethylbutanoic acid or a yield of 86% based on the assumption that 73 parts of tetramethylethylene was delivered by the injector as described in Example I.)

(B) Step 2.—Carboxyl reduction of 2,2,3-trimethylbutanoate to 2,2,3-trimethyl-1-butanol A stainless steel, pressure-resistant vessel is charged with 200 parts of butyl 2,2,3-trimethylbutanoate (prepared by esterification of the acid prepared as described above with butyl alcohol in the presence of sulfuric acid) and 20 parts of barium-promoted copper chromite catalyst. The vessel is closed, placed in a shaker machine and is pressured to 210 atms. with hydrogen. The temperature is then raised and when it reaches 269° C. the pressure is raised to 900 atms. The temperature is maintained at 269–281° C. for a period of 6.5 hours and the pressure is kept at 780–1010 atms. by periodic repressuring with hydrogen. There is an observed pressure drop of 310 atms. The vessel is then cooled, bled of excess hydrogen, opened and discharged. On filtering off the catalyst and distilling, there is obtained 108 parts of 2,2,3-trimethyl-1-butanol boiling at 156–157° C. at atmospheric pressure. This is 86.5% of the theoretical yield.

(C) *Step 3.—Hydrogenolysis of 2,2,3-trimethyl-1-butanol to triptane*

A stainless steel, pressure-resistant vessel is charged with 50 parts of the 2,2,3-trimethyl-1-butanol prepared as described above, and 10 parts of reduced, sintered cobalt oxide catalyst. The vessel is closed, evacuated, and placed in a shaker machine. After pressuring with hydrogen to 200 atms. the temperature is raised to 300° C. and the hydrogen pressure to 950 atms. Heating at 300–310° C. under this pressure is continued for 17 hours. At the end of this time the vessel is cooled, bled of excess hydrogen, opened, and discharged. On distilling through a precision rectifying column there is obtained 5 parts of a fraction boiling at 80–82° C. This is proved to be substantially pure triptane (2,2,3-trimethylbutane) by its boiling point (80–82° C. vs. 81° C. for triptane), its refractive index ($n_D^{20}$=1.3915 vs. $n_D^{20}$=1.3895 for triptane) and its infrared absorption spectrum determined by standard infrared spectroscopy. There is recovered 25 parts of unchanged 2,2,3-trimethyl-1-butanol.

The above examples merely illustrate certain specific embodiments of the invention and are not to be taken as limitative. Hence, suitable variance therefrom can be made without departing from the underlying principles and scope of the invention. Thus, in practicing the invention, using an olefin of the general formula

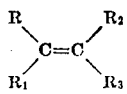

wherein R, $R_1$, $R_2$, and $R_3$ have the previously defined meanings, as the starting material, the carboxylation is generally carried out at temperatures in the range of 25° C. to 150° C., and preferably at temperatures of from 75° C. to 125° C., because under these temperature conditions a practical rate of reaction is obtained with high yield of the desired acids. In the carboxylation, however, it is essential that the acid catalyst, e. g., boron trifluoride, sulfuric acid, phosphoric acid, or the like, be present as a hydrate, preferably a half to a decahydrate and usually as a dihydrate to a tetrahydrate. In general, good agitation is desirable in such carboxylation step since a good contact is assured between the reactants and in consequence better yields of desired acids.

The carbon monoxide employed in the carboxylation of the olefin should be of commercial quality and should be present in excess of a mol per mol of the olefin in the reaction mixture.

In the step of hydrogenating the carboxylic acid obtained to the corresponding alcohol, it is desirable first to esterify the acid and for this purpose the preferred alcohols are the lower saturated monohydric primary alcohols, such as methyl, ethyl, propyl, butyl, amyl, and the like, alcohols. The hydrogenation is carried out over a mild-acting alcohol-forming hydrogenation catalyst at temperatures of from 100° C. to 500° C. and generally at temperatures of from 250° C. to 350° C. The amount of catalyst varies from about 1% to 40%, and generally from about 5 to about 25%, of the weight of the carboxylic compound being hydrogenated. By a mild-acting alcohol-forming hydrogenation catalyst, as used herein, is meant a catalyst which is selective for the reduction of carboxylic compounds to the corresponding alcohols. These catalysts are termed alcohol-forming to distinguish them from the more energetic hydrocarbon-forming elements of the platinum and ferrous metal groups. In general, suitable catalysts are those selected from the group of the non-ferrous hydrogenating metals such as copper, tin, silver, cadmium, zinc, lead, their oxides and chromites and oxides of manganese and magnesium. Catalysts suitable for use in the liquid phase batch method for hydrogenating carboxylic compounds are preferably prepared in powder form. The preferred catalysts for this purpose are those containing copper chromite as an essential component and are prepared by heating a double chromate of copper and a nitrogen base to its spontaneous decomposition temperature, as described in U. S. Patents 1,746,783, 1,964,001, 2,066,153 and 2,137,407. Many modifications of this procedure have been practiced involving the use of acid extraction, hydrogen reduction and the use of supports such as kieselguhr, but these modify the catalyst in degree only. The essential feature is the use of copper oxide intimately associated with or combined chemically with chromium sesquioxide. The method, however, is not limited to copper but may be practiced in the preparation also of zinc chromite, silver chromite, nickel chromite, cobalt chromite, manganese chromite, and the like.

The carboxylic acid hydrogenation is generally carried out at pressures in excess of 100 lbs./sq. in. and usually at pressures ranging from 1000 to 15,000 lbs./sq. in.

In the hydrogenolysis step, temperatures which may range from about 100° C. to about 400° C., and preferably from 175° C. to 375° C., are employed. The amount of catalyst will generally range from about 1 to about 40%, and usually from about 5 to 25% on the weight of the alcohol. Hydrogen pressures in excess of 100 lbs./sq. in., and usually ranging from about 1000 to 15,000 lbs./sq. in., are employed.

For use in the continuous method of reducing the carboxylic compound, certain metal oxides belonging to the class of difficultly-reducible hydrogenating oxides may be conveniently employed on account of their ruggedness and ease with which they may be shaped into hard granules for loading into stationary apparatus.

By "difficultly-reducible" is meant that the oxide is not substantially reduced to the metal by prolonged exposure in a state of purity to the action of hydrogen at atmospheric pressure and a temperature of 400 to 450° C. Such oxides suitable for use as catalysts in the hydrogenation step are zinc oxide, manganese oxide, and magnesium oxide. These oxides may be employed either alone or in combination with each other or with other metal oxides, such as chromium sesquioxide.

Although cobalt is the preferred catalyst for use in the hydrogenolysis of the alcohols to the corresponding hydrocarbons because of its high degree of selectivity, other base metal or ferrous group metal hydrogenation catalysts may be used, such as nickel, iron and the like. These catalysts may be made by the erosion of alloys, by the reduction of salts with sodium naphthalene in accordance with the methods disclosed and claimed in U. S. Patent 2,177,412, or by the reduction of the metal oxide with hydrogen at 400° C. to 700° C.

In general, the hydrogenation of the carboxylic compound and the hydrogenolysis of the alcohol are carried out using an amount of hydrogen in excess of that required theoretically.

The process of hydrogenating the carboxylic compound to the corresponding alcohol may be carried out in the presence of inert solvents or in the absence of such solvents. Examples of specific organic solvents which can be used are the saturated lower primary aliphatic alcohols, e. g., methyl alcohol, ethyl alcohol, propyl alcohol, etc., ethers and hydrocarbons. In general, any solvent may be used which is substantially inert to hydrogenation under the conditions employed and which is a liquid at the reaction temperatures and pressures used. The hydrogenolysis of the alcohol is preferably carried out in the absence of solvents but, if desired, it can be carried out in solution in inert solvents.

Although 2,2,3-trimethyl-1-butanol comprises a preferred useful type of primary aliphatic mono-hydroxy alcohol for preparing the alkanes of this invention, use is contemplated of tertiary alkyl carbonols generally, having the formula:

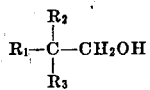

in which $R_1$, $R_2$ and $R_3$ are alkyl groups containing not more than 6 carbons, and more especially consist of such lower alkyl radicals as methyl, ethyl, propyl, butyl, pentyl and the like. Specific examples of other useful carbinol intermediates include: neopentyl alcohol, 2,2-dimethyl-1-butanol, 2-ethyl-2-methyl-1-butanol, 2-propyl-2-ethyl-1-butanol; and the like.

In place of the 2,3-dimethyl-2-butene shown in the examples, monoolefins of the general formula

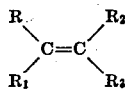

wherein R and $R_1$ are alkyl groups and $R_2$ and $R_3$ are from the class of hydrogen and alkyl groups, can be used. Examples of such compounds are isobutylene, trimethylethylene 2,3-diethyl-2-butene, 2-ethyl-3-methyl-2-butene, 2,3-dibutyl-2-butene, 2,3-dipentyl-2-butene, and the like.

In place of the butyl ester of the 2,3-dimethylbutanoic acid of the examples, there can be used other saturated aliphatic monohydric primary alcohol esters and among suitable examples are the methyl, ethyl, propyl, amyl, heptyl, and the like esters. In place of the esters there can be used the free acid or its anhydride but these are less preferred because under the conditions of reaction they tend to corrode the equipment used.

We claim as our invention:

1. A process for producing hydrocarbons having the general formula

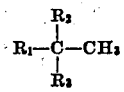

wherein $R_1$, $R_2$ and $R_3$ are alkyl groups, from a tertiary alkyl carbinol having the formula

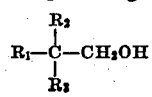

wherein $R_1$, $R_2$ and $R_3$ are alkyl groups, which comprises hydrogenating said carbinol at an elevated temperature and superatmospheric pressure, and in the presence of a base metal catalyst.

2. A process for producing alkanes having the general formula

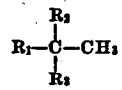

wherein $R_1$, $R_2$ and $R_3$ are alkyl radicals containing 1–6 carbon atoms, from tertiary alkyl carbinols having the formula

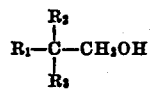

in which $R_1$, $R_2$ and $R_3$ are alkyl radicals containing 1–6 carbon atoms, which comprises contacting said carbinols with hydrogen in the presence of a cobalt hydrogenation catalyst at an elevated temperature and pressure and until hydrogenolysis is complete.

3. A method for producing trimethylbutane by direct conversion of a tertiary alkyl carbinol which comprises hydrogenating 2,2,3-trimethyl-1-butanol under a superatmospheric pressure and at an elevated temperature in the presence of a metallic cobalt catalyst, and thereafter recovering the resulting trimethylbutane from the mixture of reaction products.

4. A method for obtaining a hydrocarbon of the general formula:

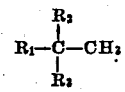

wherein $R_1$, $R_2$ and $R_3$ are alkyl groups, by direct conversion of a tertiary alkyl carbinol having the formula:

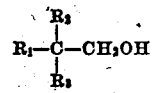

wherein $R_1$, $R_2$ and $R_3$ are alkyl groups, which comprises hydrogenating said carbinol at a temperature ranging from 100–400° C., and a pressure in excess of 100 pounds per square inch, in the presence of from 1–40%, based on the weight of the alcohol, of a cobalt hydrogenation catalyst.

5. A method for producing an alkane having the general formula:

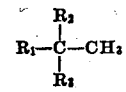

wherein $R_1$, $R_2$ and $R_3$ are alkyl radicals containing 1–6 carbon atoms, through the direct conversion of a tertiary alkyl carbinol having the formula:

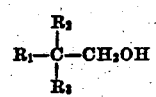

in which $R_1$, $R_2$ and $R_3$ are alkyl radicals containing 1–6 carbon atoms, which comprises contacting the carbinol with hydrogen in the presence of from 5–25% by weight, based on the weight of the alcohol, of a cobalt hydrogenation catalyst, and during said contact and until hydrogenolysis is complete, maintaining a temperature ranging from 175–375° C. and a superatmospheric pressure of from 1000–15,000 pounds per square inch on the reactants.

THOMAS AVEN FORD.
HENNING WALDEMAR JACOBSON.

REFERENCES CITED

The following references are of record in the file of this patent:

UNITED STATES PATENTS

| Number | Name | Date |
| --- | --- | --- |
| 1,924,766 | Carpenter | Aug. 29, 1933 |
| 2,091,800 | Adkins et al. | Aug. 31, 1937 |
| 2,184,930 | Ruys et al. | Dec. 26, 1939 |

OTHER REFERENCES

Escourrou, Bull. Soc. Chem. (4) 43, 1112–15 (1928). (Pat. Off. Lib.)

Sabatier et al., Annales de Chimie (9) 4, 253–7 (1915).

Edgar et al., Jour. Am. Chem. Soc., vol. 51, 1438–91 (1929). (Pat. Off. Library.)